United States Patent [19]

Kajiwara et al.

[11] Patent Number: 5,189,712
[45] Date of Patent: Feb. 23, 1993

[54] CORRELATION DETECTOR FOR IMAGES

[75] Inventors: Yasuya Kajiwara; Kazumichi Tsutsumi, both of Hyogo, Japan

[73] Assignee: Mitsubishi Denki K.K., Tokyo, Japan

[21] Appl. No.: 731,605

[22] Filed: Jul. 17, 1991

[30] Foreign Application Priority Data

Jul. 17, 1990 [JP] Japan .................... 2-191658

[51] Int. Cl.[5] .............................. G06K 9/64
[52] U.S. Cl. ....................... 382/42; 364/819; 365/149; 382/30
[58] Field of Search ............... 382/42, 30, 34, 48; 364/724.12, 819, 820, 823, 824; 365/149

[56] References Cited

U.S. PATENT DOCUMENTS

| | | | |
|---|---|---|---|
| 4,574,357 | 3/1986 | Pastor et al. | 382/42 |
| 4,623,923 | 11/1986 | Orbach | 382/42 |
| 4,939,575 | 7/1990 | Childers | 382/42 |
| 4,998,286 | 3/1991 | Tsujiuchi et al. | 382/42 |
| 5,007,101 | 4/1991 | Iwahashi et al. | 382/42 |

Primary Examiner—Joseph Mancuso
Attorney, Agent, or Firm—Sughrue, Mion, Zinn, Macpeak & Seas

[57] ABSTRACT

A correlation detector for images including: a unit for converting pixel signals of two images into digital data; a unit for deriving either an absolute value of a difference between the two pixel signals or a product of the two pixel signals from a table in accordance with pixel signal values of the two images; a unit for converting the derived value into an analog value; and a unit for storing electric charges while converting the converted analog value into a current value which is proportional to the converted analog value. Since the correlation between the two images are calculated using a table and the addition is performed in terms of storing electric charges, the correlation detector can be down-sized with simple circuits and its operation speed is improved as well.

3 Claims, 2 Drawing Sheets

CORRELATION DETECTOR FOR IMAGES

BACKGROUND OF THE INVENTION

1. Field of the Invention

The invention relates to a correlation detector for measuring distances and tacking images by calculating a correlation between two images.

2. Prior Art

Methods of tracing the locus of a moving object by calculating a correlation between two images are disclosed in, e.g., Japanese Patent Unexamined Publication Nos. 135587/1982 and 135588/1982. Conventional devices using such methods calculate the correlation by converting an analog signal of respective pixels into a digital signal, storing the converted digital signal, and causing their digital operation unit to directly multiply/add a digital signal of their corresponding pixels.

In multiplication, instead of using a microcomputer which is slow, a multiplicity of juxtaposed digital circuits, each being dedicated to multiplication, are usually used to output products that are further subjected to addition. Specifically, let it be assumed that there are two images A, B having pixels in m rows and n columns and that the magnitudes of each pixel signal in the images A, B are represented as being $p_{ij}$, $q_{ij}$, respectively, as shown in FIG. 2, then, the correlation C of the two images can be calculated by the following equation (1).

$$C = \sum_{i=1}^{m} \sum_{j=1}^{n} p_{ij} \cdot q_{ij} \quad (1)$$

Instead of the above calculation, the sum total D in absolute value of differences between the respective pixels can be calculated by the following equation (2).

$$D = \sum_{i=1}^{m} \sum_{j=1}^{n} |P_{ij} - Q_{ij}| \quad (2)$$

In such calculations the respective pixel signals digitized by analog/digital converters 1, 2 are stored in memories 3, 4. And the stored signal data are sequentially applied to a plurality of multipliers 5, 6, 7, 8 by a clock signal for multiplication, and each obtained product is added by an adder 9 so that the sum can be stored in a register 10.

Since the conventional correlation calculators are constructed as described above, their multiplying operation is time-consuming. For realtime operations, the multiplicity of multiplying circuits must be driven concurrently and the products are added thereafter, which requires that the calculators be not only large in structure but also expensive.

The invention has been made in view of the above circumstances. Accordingly, an object of the invention is to provide an inexpensive correlation detector for images which consists of simple circuits and is capable of calculating correlations on a realtime basis.

SUMMARY OF THE INVENTION

To achieve the above object, the invention is applied to a correlation detector for images which includes: means for converting pixel signals of two images into digital data; means for deriving either an absolute value of a difference between the two pixel signals or a product of the two pixel signals from a table in accordance with pixel signal values of the two images; means for converting the derived value into an analog value; and means for storing electric charges while converting the converted analog value into a current value which is proportional to the converted analog value.

In the invention the correlation between the two images is calculated using a table and the addition is performed in terms of storing electric charges. Therefore, the multiplication can be performed at such a high speed as a single clock. In addition, the circuit for converting the output value into analog data and storing the analog data as electric charges can also be operated at a switching speed as high as a single clock.

DETAILED DESCRIPTION OF THE PREFERRED EMBODIMENT

Figure 1:
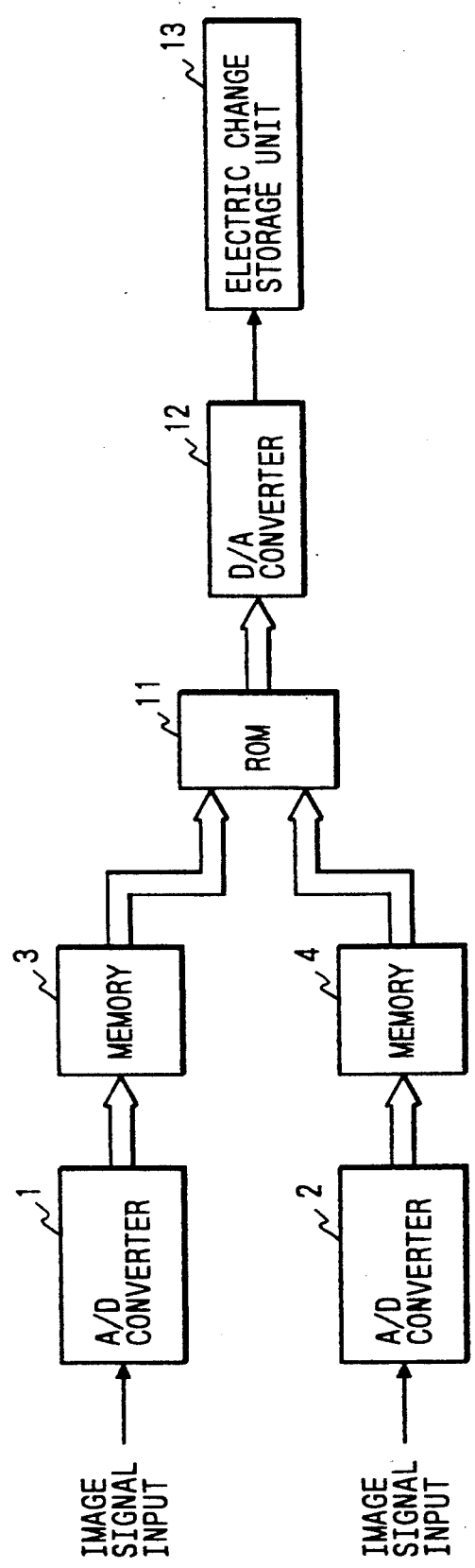
FIG. 1 is a block diagram showing a correlation detector for images, which is an embodiment of the invention.
Figures 2, 3:
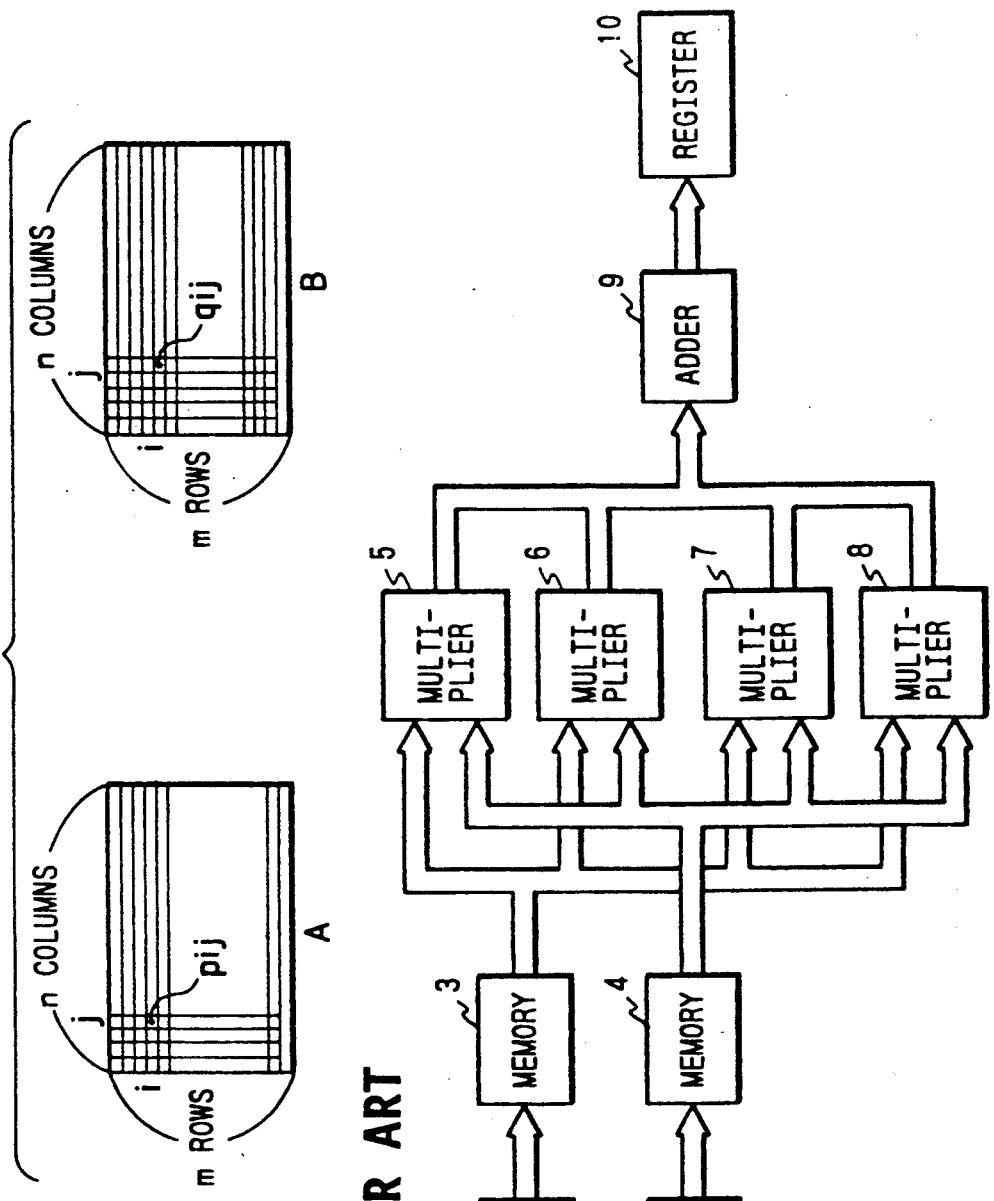
FIG. 2 is a diagram illustrating the correlation calculation for two images.
FIG. 3 is a block diagram showing a conventional correlation calculator..

An embodiment of the invention will now be described with reference to the accompanying drawings. FIG. 1 is a block diagram showing a correlation detector for images of the invention. In FIG. 1, reference numerals 1 through 4 designate the same parts of the conventional correlation calculator shown in FIG. 3, and their descriptions thus will be omitted. Reference numeral 11 designates a read only memory (ROM) storing a table; 12, a digital/analog converter; and 13, an electric charge storage unit.

The operation of this correlation detector will be described next. Pixel signals of two images are applied to analog/digital converters 1, 2 to be converted from analog data to digital data, and the obtained digital data are stored in memories 3, 4, respectively. Let it be assumed, e.g., that the respective pixel signals, each being digitized in 8 bit form, are stored in memories 3, 4. Then, to calculate the pixel signal as data, e.g., a product obtained by multiplying two 8-bit values or an absolute value of a difference between the two values is stored in the ROM 11 as a table, and any calculated result is read therefrom.

Here, it is assumed that the magnitude $p_{ij}$ at an i row and a j column of an image A is expressed in an 8-bit hexadecimal digital value $X_A$, $Y_A$ and that the magnitude $q_{ij}$ at an i row and a j column of an image B is expressed in an 8-bit hexadecimal digital value $X_B$, $Y_B$. And when the ROM 11 is accessed with a 16-bit address consisting of $X_A$, $Y_A$ being a higher 8 bits and $X_B$, $Y_B$ being a lower 8 bits, then a product of $X_A$, $Y_A$ and $X_B$, $Y_B$ is stored at such address as 16-bit data.

Further, if the table is an absolute value of a difference between two values, then it could be 8-bit data that is stored in the ROM, and the absolute value of the difference between $X_A$, $Y_A$ and $X_B$, $Y_B$ is thus stored. These data are sequentially read in correspondence with the magnitude of a pixel signal, converted into an analog signal by the digital/analog converter 12, and further converted into current that is proportional to the converted analog signal so that the electric charge is stored by the electric charge storage unit 13. Accordingly, the completion of scanning all the pixels of a single image means that the correlation of the image has been calculated. If the amount of the stored electric charge is converted into a voltage or current, then the above value can be read. Capacitors may be used as means for storing the electric charge.

As described in the foregoing, in the invention the correlation of two images is calculated using a table and the addition is performed in terms of storing the electric charge. Therefore, the correlation detector can be down-sized with simple circuits and its operation speed is improved as well.

What is claimed is:

1. A correlation detector for images, comprising:
   means for converting a first plurality of pixel signals representing a first image and a second plurality of pixel signals representing a second image into digital data;
   means for deriving one of (a) an absolute value of a difference between each pixel signal of said first plurality and a corresponding pixel signal of said second plurality, and (b) a product of each pixel signal of said first plurality and said corresponding pixel signal of said second plurality, from a table in accordance with pixel signal values of the pixel signals of said first plurality and said corresponding pixel signals of said second plurality;
   means for converting said derived values into analog values; and
   means for storing said analog values as electric charges by converting said analog values into current values proportional to said converted analog values, said storing means performing a mathematical summation operation on said analog values.

2. A detector as claimed in claim 1, wherein said deriving means comprises a read only memory storing said table.

3. A detector as claimed in claim 1, wherein said storing means comprises a capacitor.

* * * * *